United States Patent [19]

Mikan, Jr. et al.

[11] Patent Number: 5,636,156
[45] Date of Patent: Jun. 3, 1997

[54] ADDER WITH IMPROVED CARRY LOOKAHEAD STRUCTURE

[75] Inventors: Donald G. Mikan, Jr.; Martin S. Schmookler, both of Austin, Tex.

[73] Assignee: International Business Machines Corporation, Armonk, N.Y.

[21] Appl. No.: 730,166

[22] Filed: Oct. 15, 1996

Related U.S. Application Data

[63] Continuation of Ser. No. 354,403, Dec. 12, 1994, abandoned.

[51] Int. Cl.⁶ .................................................. G06F 7/50
[52] U.S. Cl. .................................................. 364/787
[58] Field of Search ....................................... 364/787

[56] References Cited

U.S. PATENT DOCUMENTS

| | | | |
|---|---|---|---|
| 4,099,248 | 7/1978 | Borgerson et al. | 364/787 |
| 4,677,584 | 6/1987 | Steck | 364/784 |
| 4,764,888 | 8/1988 | Holden et al. | 364/788 |
| 4,858,168 | 8/1989 | Hwang | 364/787 |
| 4,924,423 | 5/1990 | Vassiliadis et al. | 364/738 |
| 4,962,471 | 10/1990 | Cornelissen | 364/787 |
| 5,136,539 | 8/1992 | Kumar | 364/787 |
| 5,257,218 | 10/1993 | Poon | 364/787 |
| 5,278,783 | 1/1994 | Edmondson | 364/787 |

OTHER PUBLICATIONS

Richard P. Brent, et al. "A Regular Layout for Parallel Address", IEEE, 1982 pp. 260–264.

Robert K. Montoye, "Area–Time Efficient Addition in Charge Based Technology", 19th Design Automation Conference, Jun. 1981, pp. 862–872.

Tackdon Han, et al., "Fast Area–Efficient VLSI Adders", Proceedings Computer Arithmetic, The Computer Society of the IEEE, May 1987, Como, Italy, pp. 49–55.

Binay Sugla, et al., "Extreme Area–Time Tradeoffs in VLSI", IEEE Transactions on Computers, vol. 39, No. 2, Feb. 1990, pp. 251–257.

Kazumasa Suzuki, et al., "A 500 MHz, 32 bit, 0.4 θm CMOS RISC Processor", IEEE Journal of Solid State Circuits, vol. 29, No. 12, Dec. 1994, pp. 1464–1473.

*Primary Examiner*—David H. Malzahn
*Attorney, Agent, or Firm*—Mark E. McBurney; Andrew J. Dillon

[57] ABSTRACT

An adder circuit is disclosed having an improved carry lookahead arrangement. The number of carry lookahead stages required is log n, where n is equal to the number of bits in the adder. This arrangement has fanout limit based on the number of sets of propagate and generate signals which can be combined at each bit location of each stage. For example, if two-way merge circuits are used to combine two sets of signals together, then the maximum fanout from the previous stage would be limited to two (2). If four-way merge circuits were used, then the fanout would be limited to four (4). This low fanout is achieved without increasing the number of stages by overlapping the groups that are combined in each step.

7 Claims, 5 Drawing Sheets

Fig. 5 (Prior Art)

| Bit position | 1st stage inputs F0=4 | 2nd stage inputs F0=13 (bit 4) |
|---|---|---|
| 1 | — | 1 |
| 2 | — | 1, 2 |
| 3 | — | 1, 2, 3 |
| 4 | — | 1, 2, 3, 4 |
| 5 | 5 | 4, 5 |
| 6 | 5, 6 | 4, 6 |
| 7 | 5, 6, 7 | 4, 7 |
| 8 | 5, 6, 7, 8 | 4, 8 |
| 9 | 9 | 4, 8, 9 |
| 10 | 9, 10 | 4, 8, 10 |
| 11 | 9, 10, 11 | 4, 8, 11 |
| 12 | 9, 10, 11, 12 | 4, 8, 12 |
| 13 | 13 | 4, 8, 12, 13 |
| 14 | 13, 14 | 4, 8, 12, 14 |
| 15 | 13, 14, 15 | 4, 8, 12, 15 |
| 16 | 13, 14, 15, 16 | 4, 8, 12, 16 |

Fig. 6

| Bit position | 1st stage inputs F0=4 | 2nd stage inputs F0=4 |
|---|---|---|
| 1 | — | 1 |
| 2 | — | 1, 2 |
| 3 | — | 1, 2, 3 |
| 4 | — | 1, 2, 3, 4 |
| 5 | 2, 3, 4, 5 | 1, 5 |
| 6 | 3, 4, 5, 6 | 2, 6 |
| 7 | 4, 5, 6, 7 | 3, 7 |
| 8 | 5, 6, 7, 8 | 4, 8 |
| 9 | 6, 7, 8, 9 | 1, 5, 9 |
| 10 | 7, 8, 9, 10 | 2, 6, 10 |
| 11 | 8, 9, 10, 11 | 3, 7, 11 |
| 12 | 9, 10, 11, 12 | 4, 8, 12 |
| 13 | 10, 11, 12, 13 | 1, 5, 9, 13 |
| 14 | 11, 12, 13, 14 | 2, 6, 10, 14 |
| 15 | 12, 13, 14, 15 | 3, 7, 11, 15 |
| 16 | 13, 14, 15, 16 | 4, 8, 12, 16 |

ADDER WITH IMPROVED CARRY LOOKAHEAD STRUCTURE

This is a continuation of application Ser. No. 08/354,403, filed Dec. 12, 1994, now abandoned.

BACKGROUND OF THE INVENTION

1. Technical Field

The invention relates generally to digital integrated circuits and, more particularly, to digital adders using carry lookahead. More particularly still, the present invention relates to carry lookahead adders having minimum gate levels and gates with limited fanin and fanout.

2. Description of the Related Art

The typical digital microprocessor uses a digital, or binary, adder. The adder is typically used to provide numerical sums as well as to implement numerous other logic functions. In a typical microprocessor, many adders are used for these functions. When two digital words are added, the carry bit that results from the addition of the lesser significant bits must be considered. This can easily be done by rippling a carry signal as the addition is performed. A problem with this, particularly for large words, is that substantial time is required to ripple the carry signals through the entire addition chain. Further, since the adders are often performing adder functions in critical time paths, the time needed to ripple the carry signal can slow up the microprocessor. Therefore, various adder designs employing carry lookahead or carry skip logic have been used.

One such method for implementing an adder is described in the article by R. K. Montoye, "Area-time efficient addition in charge based technology," 19th Design Automation Conference, pp. 862–872, June 1981. In Montoye, the number of stages of logic needed to compute all carries is log n (base 2). Thus, the carries of a 16-bit adder can be developed in four stages, the carries for a 32-bit adder can be developed in five stages and for a 64-bit adder, they can be developed in six stages. Unfortunately, the worst fanout at each stage doubles and reaches n/2 for one of the inputs to the last stage.

Another well-known method is described in R. P. Brent and H. T. Kung, "A regular layout for parallel adders," IEEE Trans. on Computers, vol. C-31, pp. 260–264, March 1982. In the Brent and Kung teaching, the method limits the fanout to two but with a gate delay of 2(log n)–1 stages.

The basic circuit used in both of the above designs is one that merges the "group carry generate" and "group carry propagate" signals from a pair of similar circuits in the previous stage, to produce a new pair of generate and propagate signals. Yet, both methods still suffer from delay problems, one due to large fanout on some gates, the other due to nearly doubling the number of gate levels.

Accordingly, what is needed is an improved design for carry lookahead adders that has a minimum number of gate levels and also limits the maximum fanout, thus resulting in faster operation.

SUMMARY OF THE INVENTION

It is therefore one object of the present invention to provide digital integrated circuits.

It is another object of the present invention to provide digital adders using carry lookahead.

It is yet another object of the present invention to provide carry lookahead adders having reduced fanout achieved without additional gate levels by using a new way of grouping bits for merging propagate and generate signals. These adders may use circuits which merge two or more sets of propagate and generate signals.

According to the present invention, an adder circuit is disclosed having an improved carry lookahead arrangement. The ordering of the carry lookaheads is based on $\log_m$ n stages, where m is the number of sets of signals that can be merged in one gate level and n is equal to the number of bits in the adder. This arrangement has a fanout limit of m. For example, if the merge circuits merged two sets of input signals together as a two-way merge circuit, then the fanout would be two (2) between stages. If the stages used four-way merge circuits, then the fanout would be four (4) between stages.

One carry lookahead structure is implemented for an adder circuit having n number of bits, wherein the bits have a hierarchy of positions from the most significant position to the least significant position. The structure includes $\log_2$ n stages of circuits for combining the group carry propagate and the group carry generate signals, respectively, for determining a carry into each bit position within the adder. Each stage of circuits consists of two-way merge circuits, each merge circuit combining the group carry propagate and the group carry generate signals from two adjacent groups of bits of the previous stage. The adjacent groups are combined in a particular order starting from the most significant group to the least significant group, to provide a group carry propagate signal and a group carry generate signal for the two adjacent groups combined. These merge circuits combine signals from pairs of groups that overlap with groups merged by other circuits within the same stage. In selected lower order bit positions of each stage, a buffer for a group generate signal is provided instead of the merge circuits signal to act as the carry for that bit position. A final stage within the log n stages is provided wherein the output group generate signal from each merge circuit is equivalent to the carry from that bit. The overlapping of groups that are merged provides a maximum fanout of two (2) from any merge circuit to the next stage.

An endaround carry structure is also provided such that in selected lower order bit positions of each stage, the merge circuits receive their less significant signals from higher order groups, which wrap around to the lower order end such that all the bits of the adder appear to form a continuous loop.

In a more generic application, the carry lookahead structure may have $\log_m$ n stages of circuits for combining the group carry propagate and group carry generate signals and each of the merge circuits then becomes an m-way merge circuit. In this arrangement, the fanout is limited to a maximum of m from any merge circuit to the next stage.

The lookahead structure is also useful in other applications. These applications include, for example, a binary coded decimal adder, an incrementer or decrementer, a leading zero detector or anticipator. In the BCD adder, the propagate and generate signals are defined such that the generate for the particular digit occurs when the sum of two (2) digits being added is greater than nine (9), thus forcing a carry into the next higher digit. The propagate is defined as the condition where the sum of the two (2) digits being added is equal to nine (9), thus propagating a carry into the next higher digit when there is a carry from the next lower digit.

When used in either an incrementer or decrementer, certain things are considered. In an incrementer, the combining functions become simplified such that a carry into a bit occurs only when the inputs to all of the lower order bits are ones. Accordingly, the combining function for a group of bits is an AND function of the corresponding inputs. Similarly, the decrementer uses a combining function for a group of bits that is the AND function of the complements of the corresponding inputs.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 5 is a chart showing the inputs to each merge circuit and fanout required in the prior art method depicted in FIG. 2, using four-way (and smaller) merge circuits;

FIG. 6 is a chart corresponding to that in FIG. 5 for an adder circuit implemented according to the present invention.

DETAILED DESCRIPTION OF PREFERRED EMBODIMENT

Figure 1:
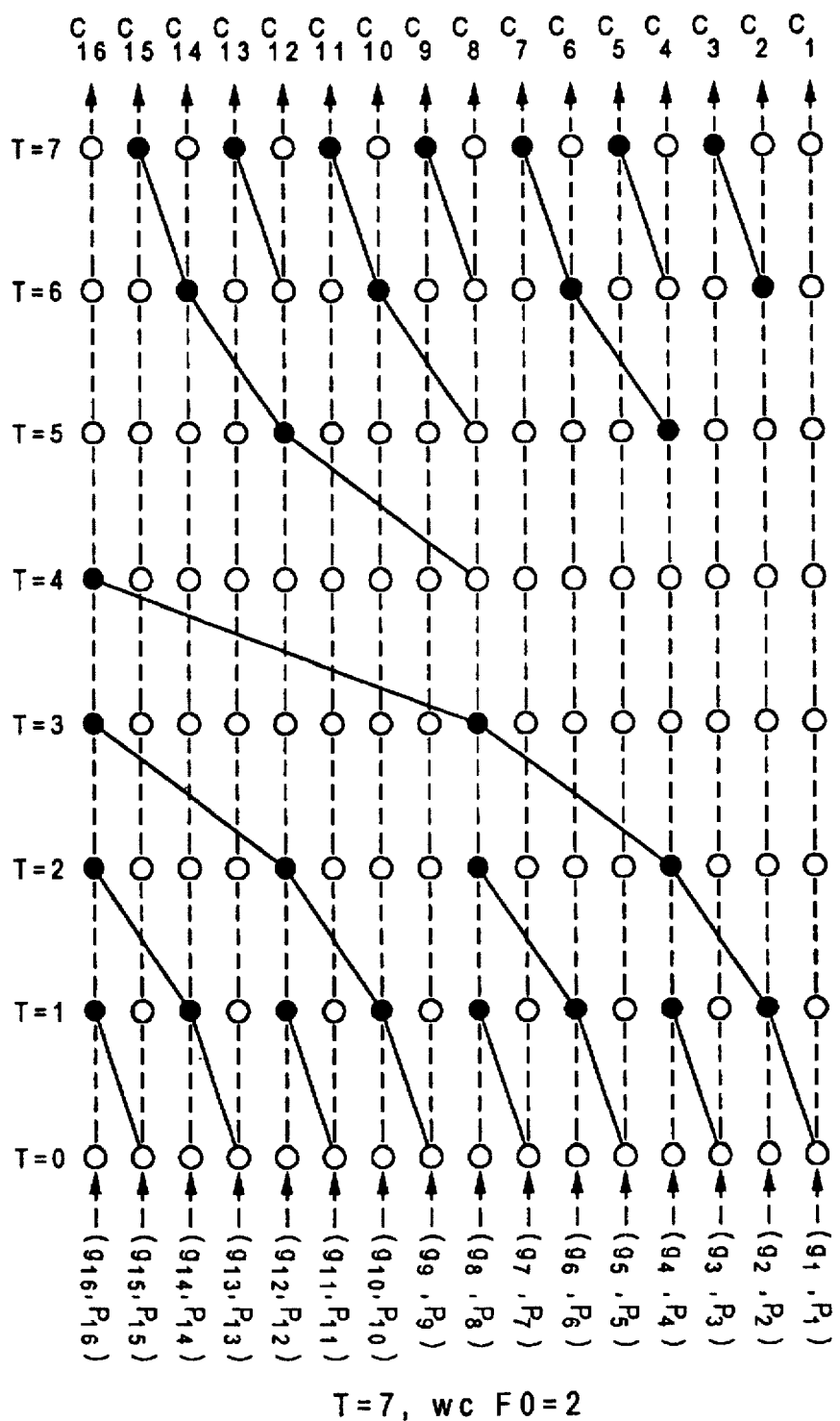
FIG. 1 depicts the fanout for a prior art adder circuit which uses two-way merge circuits.

To illustrate the differences and advantages of the present invention over the prior art methods, a further discussion of the prior art methods is provided. FIG. 1, is an illustration of the design implemented in the Brent and Kung reference discussed above. This illustration shows the connection of the necessary merge circuits for a 16-bit adder. Bit 1 on the right is the least significant bit (LSB) while bit 16 is the most significant bit (MSB). This figure reflects the order in which carries propagate. It takes seven stages to compute all the carries and the fanout for all merge circuits is limited to two. In this figure, as well as in the next two FIGS. 2 and 3, which will be described below, the black circles represent merge circuits and the white circles represent buffers, since they each have only one input. The buffers may actually be inverters if the polarity changes at each stage. Also, each connection represents a set of signals consisting of the generate and propagate signals, and possibly the zero signals.

Figure 2:
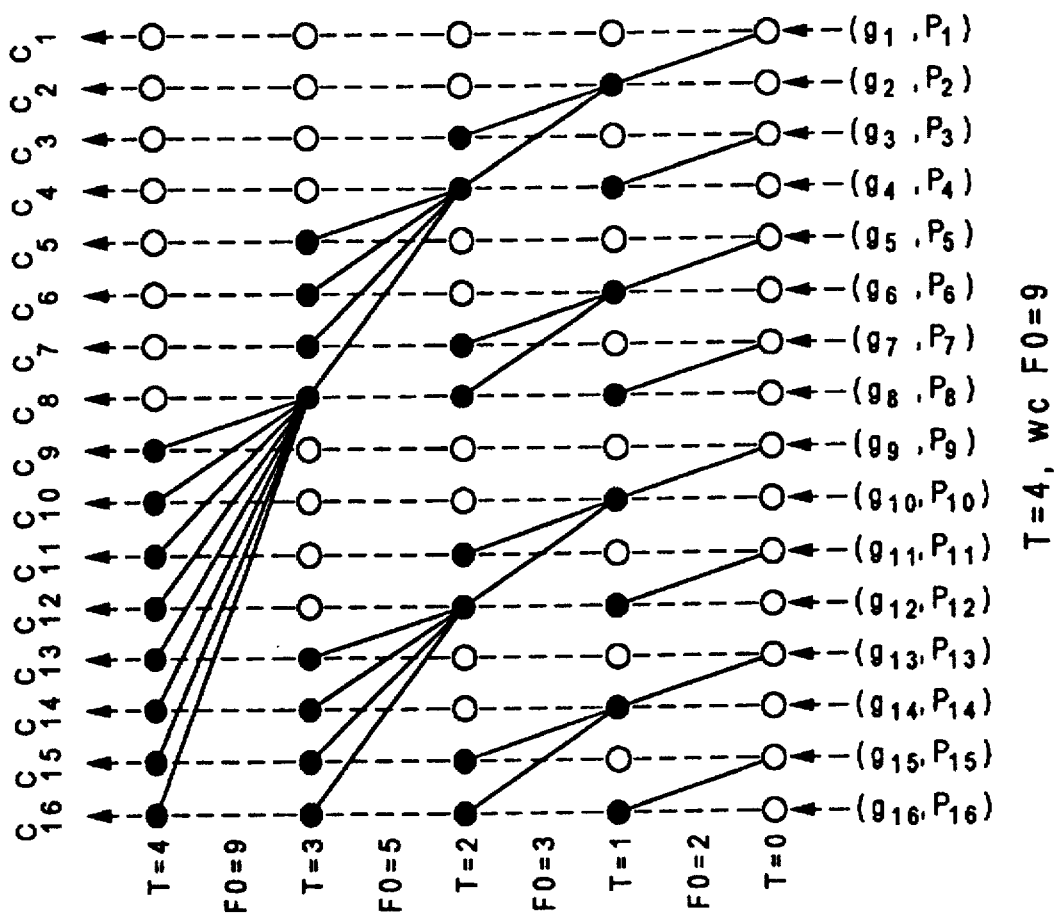
FIG. 2 depicts the fanout for another prior art adder circuit which uses two-way merge circuits.

FIG. 2 depicts how the merge circuits would be connected for the adders used in the design described by Montoye. Only four stages are needed to compute all carries, but the fanout from bit eight (8) of the third stage to the fourth stage is nine (9). This particular method handles that problem by using successively larger devices in each stage just for those few circuits that would have larger fanout.

Figure 3:
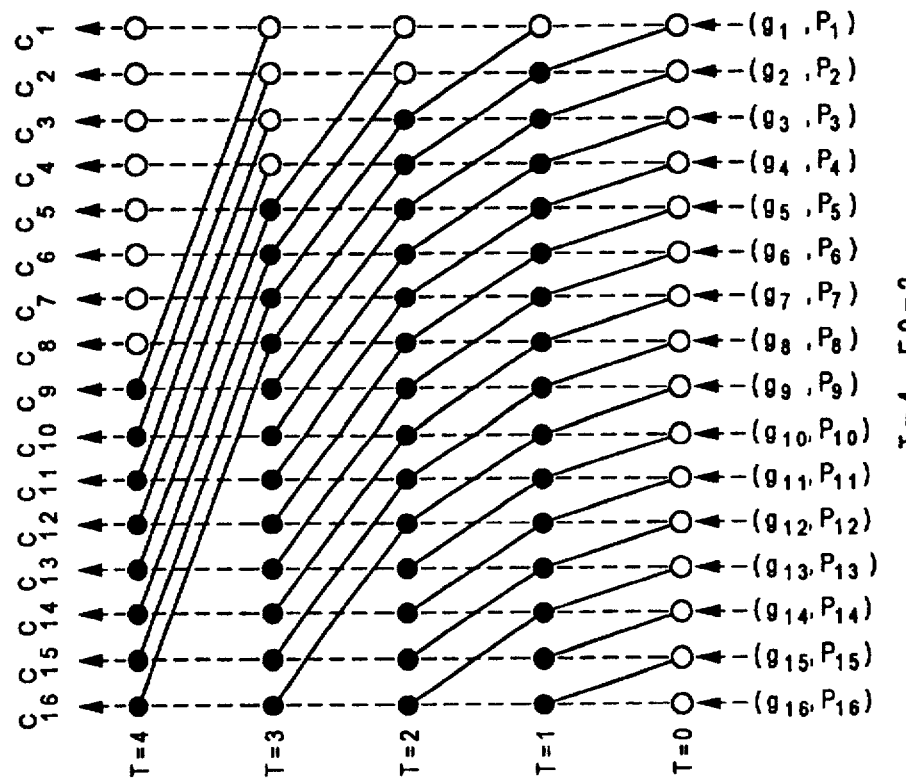
FIG. 3 depicts the fanout for an adder circuit as implemented according to the present invention using two-way merge circuits.

FIG. 3 depicts the design implemented by the present invention and how the merge circuits are connected. In this instance, the inputs to the merge circuits in all the stages after the first overlap the inputs of the adjacent merge circuits. This requires only four stages and limits fanout to two. To implement this method, more wiring space may be needed. It is the overlapping illustrated in this figure which represents the novelty and is the key to achieving low fanout.

Figure 4:
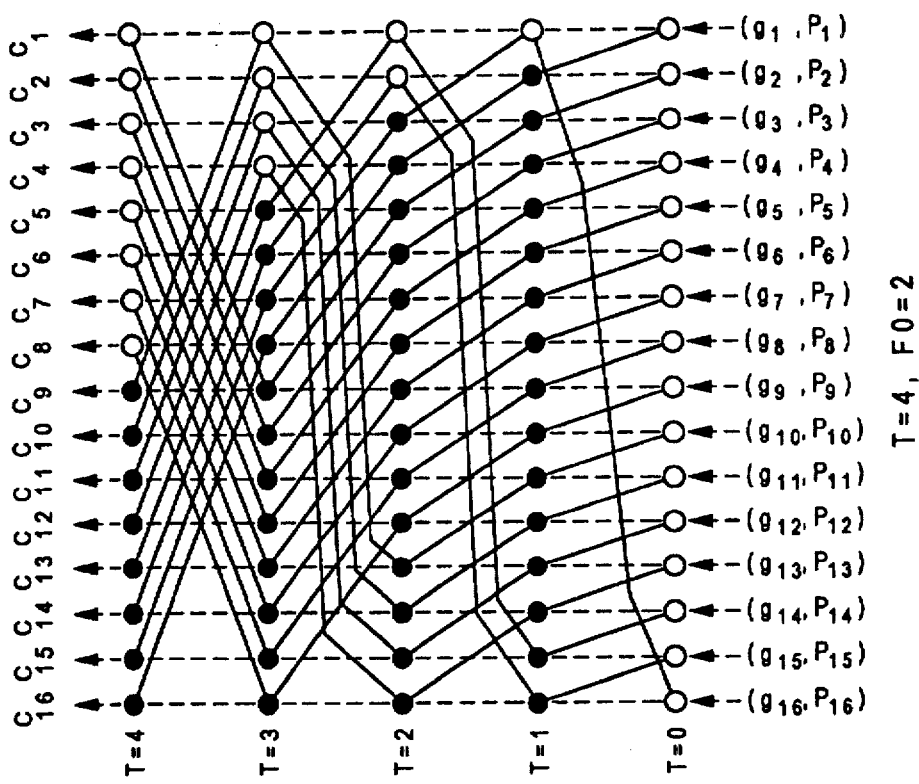
FIG. 4 depicts the fanout for the adder in FIG. 3 but with end-around carry.

This method also works with end around carry adders that are often used in floating point arithmetic. This is achieved by wrapping the high order bits around to the least significant bits. This is illustrated in FIG. 4. In this figure, all of the circuits are two-way merge circuits. The white circles in all but the bottom row represent merge circuits in which the set of signals from the left are connected to the inputs for the less significant signals (corresponding to lower order bits) while the signals coming from the same bit position of the previous stage are connected to the inputs for the more significant signals.

The importance of this improved design is more apparent when using merge circuits that merge more than two sets of signals together. The merge circuits used may be those described in U.S. patent application Ser. No. 08/331,436 filed Oct. 31, 1994, entitled, *Adder Circuits and Magnitude Comparator*, commonly assigned to the assignee of this invention and commonly filed herewith, and incorporated by reference for all purposes. If four-way merge circuits are used, then the carries for a 16-bit adder can be computed in two stages. It becomes difficult to show all of the connections for a 16-bit adder using four-way merge circuits; therefore, a tabular representation of the diagrams where, in place of each circuit, the bit position that each input comes from in the previous stage is listed.

FIG. 5 illustrates the prior art scheme described in Montoye while FIG. 6 illustrates the method implemented in the present invention. The scheme in FIG. 5 requires a fanout of 13 from bit four of the first stage. For a 64-bit adder, bit 16 of the second stage would have a fanout of 49 to the third stage. This means that the fanout roughly quadruples in each succeeding stage.

By contrast, in FIG. 6, the fanout in the present invention is limited to four for all stages. In general, if m-way merge circuits are used in a particular stage, then the inputs to that stage would have fanout limited to m.

Since the improved method reduces the amount of fanout and keeps it to a fixed amount, based on the new arrangement and interconnection of the merge circuits, the processor operates more quickly than prior designs. Furthermore, the known fanout design provides for a more regular chip layout, which conserves chip real estate. More importantly, however, this invention describes a new structure that makes it practical to use circuits that merge more than two sets of signals at a time, thus resulting in adders in which the carries are computed in fewer than $\log_2$ n stages with a fixed, but higher fanout limit. Specifically, the number of stages required when using m-way merge circuits is $\log_m$ n, which is equivalent to log n/log m.

The lookahead structure has been described with reference to a particular application, namely, a binary adder. However, it can be also used in many other applications. Examples of such applications are:

a BCD (binary coded decimal) adder;

an incrementer or decrementer;

a leading zero detector;

a leading zero anticipator.

Lookahead has been used in BCD adders to reduce delay of determining the carries into each decimal digit. The concepts of propagate and generate may be applied by defining generate for a particular digit as the condition when the sum of the two digits being added is greater than nine, thus forcing a carry into the next higher digit, while propagate may be defined as the condition when the sum of the two digits being added is equal to nine, thus propagating a carry into the next higher digit when there is a carry from the next lower digit.

Lookahead has also been used in incrementers and decrementers. An incrementer may be thought of as a special case of an adder where one input operand always has the value one (1). Therefore, it is obvious that adder lookahead structures could be used. However, the combining function is much simpler. There can be a carry into a bit only when the inputs to all of the lower order bits are ones; therefore, the combining function for a group of bits is an AND of the corresponding inputs. Similarly, a decrementer is an adder in which one operand always has the value minus one (−1). The combining function for a group of bits is the AND of the complements of the corresponding inputs.

Figure 7:
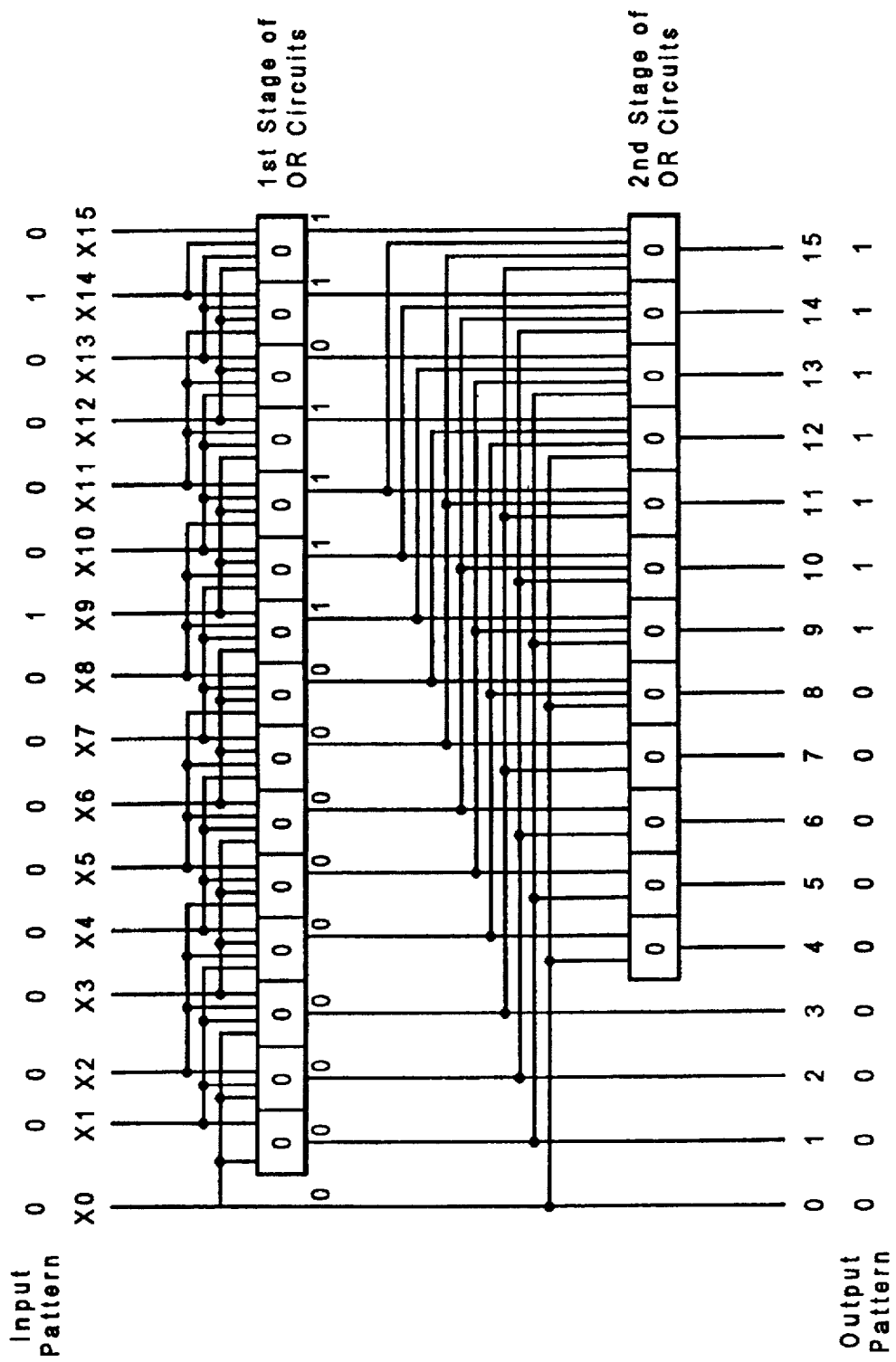
FIG. 7 depicts a two-stage lookahead OR structure for a 16-bit leading zero detector.

A leading zero detector is a circuit which counts the number of high order leading zeros that a number has. There are several applications for this function. FIG. 7 depicts an example of a two-stage lookahead OR structure for a 16-bit leading zero detector, which is implemented as follows:

at each bit position, form the OR of all higher order bits, resulting in a bit string having zeroes in the higher order bits corresponding to the leading high order zeroes of the input number, and having ones in all of the lower order bits;

at each bit position of the new bit string, detect if the bit is a zero and the next lower order bit is a one, resulting in yet a new bit string with only a single one corresponding to the first one of the input number;

encode this bit string to give the bit position of the single one, starting from the most significant bit position, such encoding being a well-known function using an OR circuit for each bit in the encoded signal. The encoded signal is a count of the number of leading zeroes.

The first part of the leading zero detector, namely, forming the OR of all higher order bits at each bit position, may be implemented using a lookahead structure to minimize the number of stages when the number of bits is large and the number of inputs to each circuit must be kept small.

A leading zero anticipator is a circuit that predicts the number of high order leading zeros or ones for the sum of two numbers. Such a circuit is often used in floating point arithmetic units. Because of its similarity in function to that of a leading zero detector, one would expect that lookahead structures would be useful in this function as well. A leading zero anticipator using a lookahead structure as described in this patent application is illustrated as the preferred embodiment of the invention in U.S. patent application Ser. No. 08/223,323, filed Apr. 15, 1994, under the title "Two State Leading Zero/One Anticipator (LZA)".

In general, lookahead structures, especially the ones described in this application, are useful when each bit of a function is dependent on either all of the lower order bits, all of the higher order bits, or all of the bits, and that the dependence can be described as a hierarchy of operations between adjacent bits, in which the operations are associative, thus allowing any groupings of adjacent bits and sub-groups in the hierarchy.

While the invention has been particularly shown and described with reference to a preferred embodiment, it will be understood by those skilled in the art that various changes in form and detail may be made therein without departing from the spirit and scope of the invention.

We claim:

1. A carry lookahead structure for use with an adder circuit which operates upon a pair of operands each having n number of bits and which generates group carry propagate and group carry generate signals in response to said operation, comprising:

$\log_m$ n stages of circuits for combining said group carry propagate and said group carry generate signals for determining the carry into each bit position, each stage of circuits having a plurality of m-way merge circuits, said plurality of merge circuits combining the group carry propagate and group carry generate signals from m adjacent groups of bits of a previous stage, said adjacent groups being combined in a particular order starting from a more significant group, to produce said group carry propagate and group carry generate signals for said m groups combined, said merge circuits combining signals from groups that overlap with groups merged by other circuits within a same stage;

in selected lower order bit positions of each stage, providing a buffer for a group carry generate signal which at that stage is equivalent to said carry from that bit position;

a final stage wherein the output group carry generate signal from each merge circuit is equivalent to said carry from that bit and wherein said overlapping of groups that are merged provides a maximum fanout of m from any merge circuit to the next stage, where m is greater than 2.

2. The invention according to claim 1 further comprising an end-around carry structure such that in selected lower order bit positions of each stage, said merge circuit gets its less significant signals from higher order groups which wrap around to the low order end wherein all the bits of the adder appear to form a continuous loop.

3. The invention according to claim 1 wherein said adder is a binary coded decimal adder.

4. A carry lookahead structure for use with an adder circuit, said adder circuit operating on a pair of operands each having n number of bits and generating group carry propagate and group carry generate signals in response to said operation, numbered from 1 to n starting from the least significant bit position, comprising:

$\log_m$ n stages of circuits for combining said group carry propagate and group carry generate signals for determining the carry into each bit position;

each stage of circuits including m-way merge circuits, said merge circuits combining the group carry propagate and said group carry generate signals from m adjacent groups of bits of a previous stage, said groups being combined in a particular order starting from a more significant group, to produce the group carry propagate and group carry generate signals for the m groups combined, said merge circuits combining signals from groups that overlap with groups merged by other circuits within the same stage;

a first stage of said $\log_m$ n stages of circuits, each circuit numbered bit i combining signals starting from bit i of the inputs to the carry lookahead structure down to bit i−m+1 of the inputs to the carry lookahead structure;

in a kth stage of said $\log_m$ n stages of circuitry, where k ranges from 2 to $\log_m$ n, each circuit in bit i combining signals from bit i of the previous stage, then from bit i−$m^{k-1}$ of the previous stage, and continuing every $(m^{k-1})$th bit down to bit i−$m^k$+$m^{k-1}$ for a total of m sets of signals;

in selected lower order bit positions of each stage, a buffer for the group carry generate signal, which at that stage is equivalent to the carry from that bit position;

a final stage of said $\log_m$ n stages of circuits, having an output group carry generate signal from each merge circuit being equivalent to the carry from that bit;

a maximum fanout from any merge circuit to the next stage being m, where m is greater than 2, as provided by said overlapping of groups.

5. The invention according to claim 4 wherein said adder is a binary coded decimal adder.

6. The invention according to claim 4 wherein said adder further includes an operand having a value of one (1), and wherein said combining function for a group of bits is an AND of the corresponding inputs.

7. The invention according to claim 4 wherein said adder further includes an operand having a value of minus one (−1), and wherein said combining function for a group of bits is an AND of the complements of the corresponding inputs.

* * * * *

UNITED STATES PATENT AND TRADEMARK OFFICE
CERTIFICATE OF CORRECTION

PATENT NO. : 5,636,156
DATED : June 3, 1997
INVENTOR(S) : Mikan, Jr. et al.

It is certified that error appears in the above-indentified patent and that said Letters Patent is hereby corrected as shown below:

Column 2, line 6:   change "log.," to --$\log_m$--

Signed and Sealed this

Second Day of September, 1997

Attest:

BRUCE LEHMAN

*Attesting Officer*        *Commissioner of Patents and Trademarks*